US009573463B2

(12) United States Patent
Maurer et al.

(10) Patent No.: US 9,573,463 B2
(45) Date of Patent: Feb. 21, 2017

(54) TRANSMISSION HAVING SELECTABLE POWER TRANSFER SHAFT

(71) Applicant: FORD GLOBAL TECHNOLOGIES, LLC, Dearborn, MI (US)

(72) Inventors: Jeffrey Edward Maurer, Commerce, MI (US); Andreas E. Perakes, Canton, MI (US); David Allen Janson, Plymouth, MI (US); Gregory Daniel Goleski, Rochester Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 194 days.

(21) Appl. No.: 14/269,539

(22) Filed: May 5, 2014

(65) Prior Publication Data

US 2014/0342869 A1 Nov. 20, 2014

Related U.S. Application Data

(60) Provisional application No. 61/824,670, filed on May 17, 2013.

(51) Int. Cl.
*B60K 17/16* (2006.01)
*B60K 17/35* (2006.01)

(52) U.S. Cl.
CPC ............... *B60K 17/16* (2013.01); *B60K 17/35* (2013.01)

(58) Field of Classification Search
CPC .................................. B60K 17/16; B60K 17/35
See application file for complete search history.

(56) References Cited

U.S. PATENT DOCUMENTS

| 7,448,977 | B2* | 11/2008 | Janson | B60K 17/34 |
| | | | | 475/200 |
| 8,608,611 | B2 | 12/2013 | Ekonen et al. | |
| 2011/0275470 | A1* | 11/2011 | Ekonen | B60K 17/35 |
| | | | | 475/198 |
| 2011/0319213 | A1 | 12/2011 | Ekonen et al. | |
| 2012/0279327 | A1 | 11/2012 | Janson et al. | |
| 2013/0310209 | A1 | 11/2013 | Downs et al. | |
| 2014/0100077 | A1 | 4/2014 | Ekonen et al. | |

* cited by examiner

*Primary Examiner* — Derek D Knight
(74) *Attorney, Agent, or Firm* — James Dottavio; Brooks Kushman P.C.

(57) ABSTRACT

A front wheel drive transmission is adapted for all-wheel drive by the addition of a selectively engageable power take-off shaft. When a disconnect clutch is engaged, power may be transferred to rear wheels via a power take-off unit and a rear drive unit to improve vehicle mobility. When the disconnect clutch is disengaged, various components of the all-wheel drive system do not rotate, reducing parasitic losses and improving fuel economy. To provide packaging space for the disconnect clutch, the differential is moved to the left (driver side) of the driven transfer gear. A planetary differential, such as a double pinion planetary differential, is suitable for this location.

21 Claims, 4 Drawing Sheets

TRANSMISSION HAVING SELECTABLE POWER TRANSFER SHAFT

CROSS-REFERENCE TO RELATED APPLICATIONS

This application claims the benefit of U.S. provisional application Ser. No. 61/824,670 filed May 17, 2013, the disclosure of which is hereby incorporated in its entirety by reference herein.

TECHNICAL FIELD

This disclosure relates to the field of automotive transmissions. More particularly, the disclosure pertains to a front wheel drive transmission with a power transfer shaft configured to selectively transfer power to rear wheels.

BACKGROUND

Two vehicle powertrain configurations predominate the modern passenger vehicle market, rear wheel drive (RWD) and front wheel drive (FWD). With additional hardware, both of these configurations can be configured to direct power to all four wheels. Because traction at any particular wheel may be limited at certain times, the ability to direct power to all four vehicle improves mobility. However, the additional hardware introduces additional parasitic losses which increase fuel consumption even in conditions that do not require the additional capability.

In a typical RWD configuration, the engine is oriented longitudinally in the vehicle such that the crankshaft axis is aligned with the direction of vehicle movement. A transmission mounted to the engine drives a rear driveshaft at a speed which may be less than or greater than the speed of the engine crankshaft according to current vehicle requirements. The rear driveshaft is connected to a rear axle that changes the axis of rotation, reduces the rotational speed, and drives left and right rear axles while permitting slight speed differences between the axles as the vehicle turns a corner. A RWD configuration is adapted to also drive the front wheels by adding a transfer case between the transmission and the rear driveshaft. In addition to driving the rear driveshaft, the transfer case drives a front driveshaft that, in turn, drives a front axle. Some transfer cases include a planetary gear set that divides the torque between front and rear driveshafts while allowing slight speed differences. Other transfer cases have an actively controlled torque on demand (TOD) clutch that only drives the front driveshaft in certain conditions, such as when a controller senses loss of traction of the rear wheels.

In a typical FWD configuration, the engine is oriented transversely in the vehicle such that the crankshaft axis is aligned with the axis of wheel rotation. A transmission mounted to the engine drives a front differential at a speed suitable for current vehicle requirements. The front differential is typically integrated into a common housing with the transmission gearbox. The front differential drives left and right front axles while permitting slight speed differences between the axles as the vehicle turns a corner. A FWD configuration is adapted to also drive the rear wheels by adding a power take off unit (PTU) that drives a rear driveshaft at a speed proportional to the speed of the front differential. A rear drive unit (RDU) typically includes a TOD clutch that, when engaged drives a rear differential that, in turn, drives left and right rear axles.

SUMMARY

A vehicle powertrain includes an engine, a multiple ratio gearbox, a transfer shaft, a differential, and a disconnect clutch. A gearbox input shaft extending from the right side of the multiple ratio gearbox is driven by a crankshaft of the engine. For example, the input shaft may be driven via a torque converter having an impeller fixed to the crankshaft and a turbine fixed to the gearbox input shaft. A gearbox output shaft is supported for rotation about the gearbox input shaft and meshes with a driven transfer gear fixed to the transfer shaft. A driving transfer gear on the transfer shaft meshes with a final drive gear. The differential, axially located to the left of the driven transfer gear, transfers power from the final drive gear to left and right axle shafts. The differential may be a planetary differential with relatively short axially length. For example, the differential may be a double pinion planetary gear set with the ring gear fixed to the final drive gear, the sun gear fixed to the one front axle shaft, and the carrier fixed to the other front axle shaft. The disconnect clutch, axially located to the right of the driven transfer gear, selectively transfers power from the final drive gear to a hollow power take-off shaft supported for rotation about the right axle shaft. The disconnect clutch may be a dog clutch. The disconnect clutch may be either normally engaged or normally disengaged. The disconnect clutch may be hydraulically actuated, electro-magnetically actuated, or actuated by other means. The vehicle may further include a power take-off unit configured to transfer power from the power take-off shaft to a longitudinal driveshaft. A rear drive unit may include a torque-on-demand clutch to selectively transfer power from the driveshaft to left and right rear axles in response to loss of traction on the front wheels.

A transmission includes a planetary differential, a clutch, and a transfer shaft. The differential is configured to transfer power from a final drive gear to left and right front axle shafts. For example, the differential may be a double pinion planetary gear set with the ring gear fixed to the final drive gear, the sun gear fixed to the one front axle shaft, and the carrier fixed to the other front axle shaft. The clutch selectively transfers power from the final drive gear to a power take-off shaft. The transfer shaft includes a driving transfer gear meshing with the final drive gear and a driven transfer gear that extends between the differential and the clutch. The transmission may also include a gearbox. A gearbox input shaft of the gearbox extends from the right side of the gearbox and a gearbox output gear rotates about the gearbox input shaft and meshes with the driven transfer gear. The transmission may also include a launch device such as a torque converter having an impeller and a turbine fixed to the input shaft. The disconnect clutch may be a dog clutch. The disconnect clutch may be either normally engaged or normally disengaged. The disconnect clutch may be hydraulically actuated, electro-magnetically actuated, or actuated by other means.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
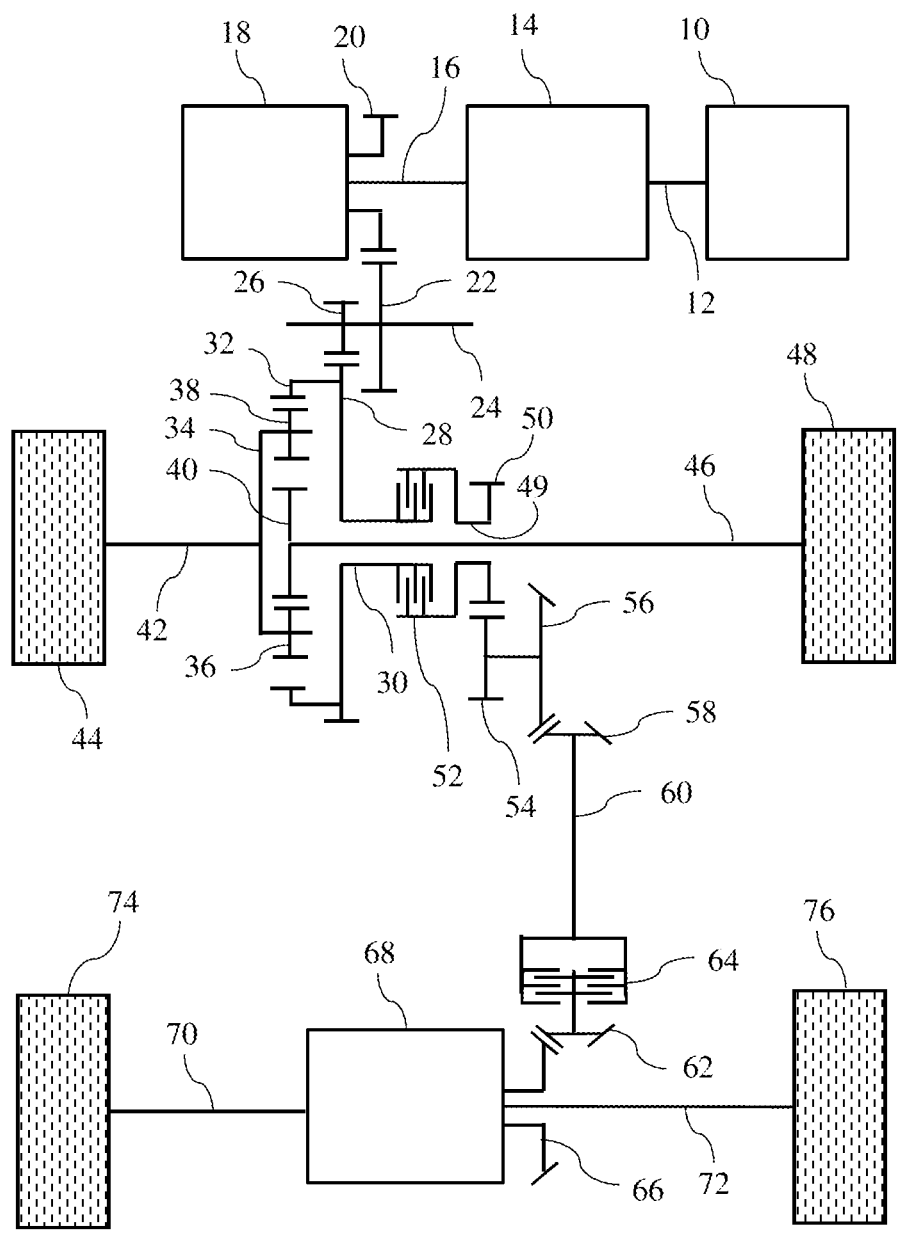
FIG. 1 is a schematic representation of a vehicle powertrain.

FIG. 1 is a schematic illustration of a FWD based all-wheel drive (AWD) powertrain configuration. Engine 10 generates power to rotate crankshaft 12. Torque converter 14 transmits the power to gearbox input shaft 16. Torque converter 14 includes an impeller fixed to crankshaft 12 and a turbine fixed to gearbox input shaft 16. The torque converter serves as a launch device by transmitting power from the engine to the gearbox input shaft without requiring that the two shafts rotate at the same speed, such as when the vehicle is starting from a stationary position. Gearbox 18 transmits power from shaft 16 to output gear 20 at a speed ratio selected from among a set of available speed ratios based on vehicle speed and accelerator pedal position. Both the gearbox input shaft 16 and the output gear 20 extend from the right side of the gearbox. Output gear 20 is supported for rotation around gearbox input shaft 16, although not necessarily supported by gearbox input shaft 16.

Output gear 20 meshes with driven transfer gear 22 which is fixed to transfer shaft 24. Driving transfer gear 26, also fixed to transfer shaft 24, meshes with final drive gear 28 which is fixed to shaft 30 for rotation about the front axle axis. Final drive gear 28 drives the ring gear 32 of a double pinion planetary differential. The double pinion planetary differential also includes a carrier 34 supporting a set of inner planet gears 36 and a set of outer planet gears 38. Each outer planet gear 38 meshes with one of the inner planet gears 36 and with interior gear teeth of ring gear 32. Each inner planet gear 36 also meshes with sun gear 40. Carrier 34 drives left (driver side) front axle 42 and left front wheel 44. Sun gear 40 drives right (passenger side) front axle 46 and right front wheel 48.

Power take-off gear 50 is fixed to power take-off shaft 49 which is selectively coupled to shaft 30 by disconnect clutch 52. Power take-off gear 50 meshes with gear 54 which drives beveled gear 56. Beveled gear 56 meshes beveled gear 58 which is fixed to driveshaft 60. Beveled gear 62 is selectively coupled to driveshaft 60 by TOD clutch 64. Beveled gear 62 meshes with beveled gear 66 which drives rear differential 68. Rear differential divides the power between left rear axle 70 and right rear axle 72 which drive left rear wheel 74 and right rear wheel 76 respectively.

The powertrain of FIG. 1 can be operated with disconnect clutch 52 engaged or disengaged. Power is transferred to the front wheels independent of the state of disconnect clutch 52. When disconnect clutch 52 is engaged, the powertrain provides the advantages associated with a FWD based all-wheel drive powertrain configuration. Specifically, if a controller senses that the front wheels have lost traction, TOD clutch 64 is engaged to transfer power to the rear wheels. During a maneuvers that are likely to result in loss of traction of the front wheels, such as rapid acceleration, the TOD clutch may be engaged pre-emptively.

When disconnect clutch 52 is disengaged, many of the components no longer rotate. Specifically, power take-off gear 50, bevel gear 56, and driveshaft 60 no longer rotate. Any parasitic losses attributable to the rotation of these components is eliminated, improving fuel economy. Determination of whether to engage disconnect clutch 52 may be based on explicit driver or may be based on sensing of operating conditions such as temperature that are correlated with likelihood of loss of traction.

Figure 2:
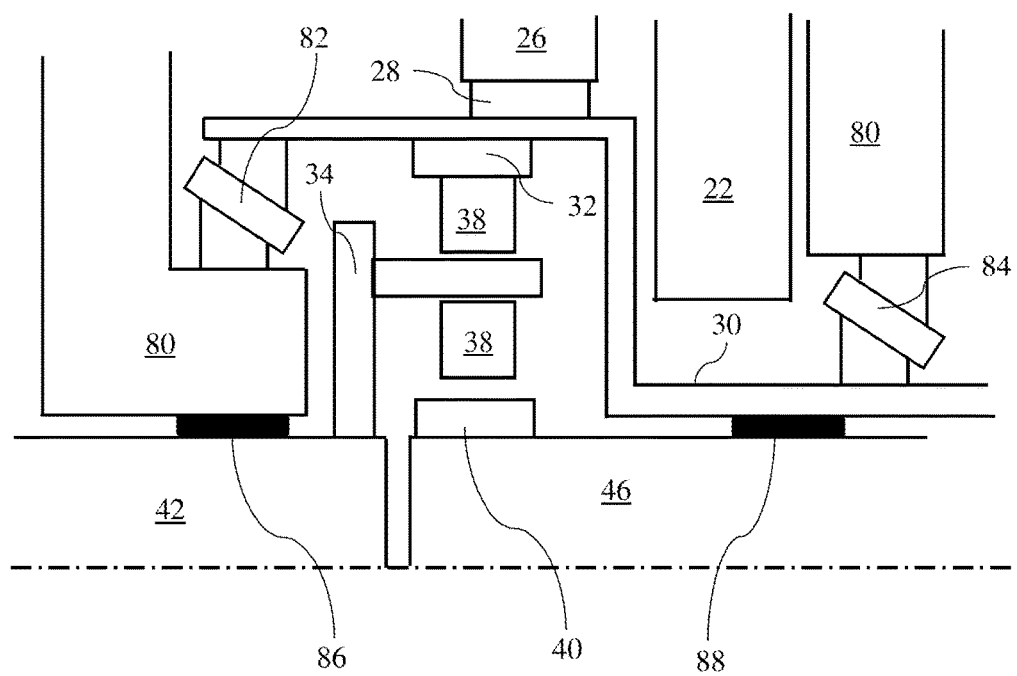
FIG. 2 is a cross sectional view of a planetary differential suitable for use in the powertrain of FIG. 1.

FIG. 2 shows the structure of the planetary differential in more detail. Transmission housing 80 supports shaft 30 via tapered roller bearings 82 and 84. Transmission housing also supports left front axle 42 via roller bearings 86 and supports right front axle 46 via roller bearings 88. Unlike a bevel gear differential, the axis of rotation of the planet gears of a planetary differential are parallel to the axle axis. The relatively short axial length of a planetary differential relative to a bevel gear differential permits packaging the differential to the left of driven transfer gear 22, making the space on the right side of the driven transfer gears available for disconnect clutch 52. This arrangement also accommodates a driven transfer gear with a relatively large diameter permitting a greater degree of speed reduction and torque multiplication. Although a double pinion planetary differential is illustrated, other types of planetary differential have sufficiently short axial length to package in this available space.

Figure 3:
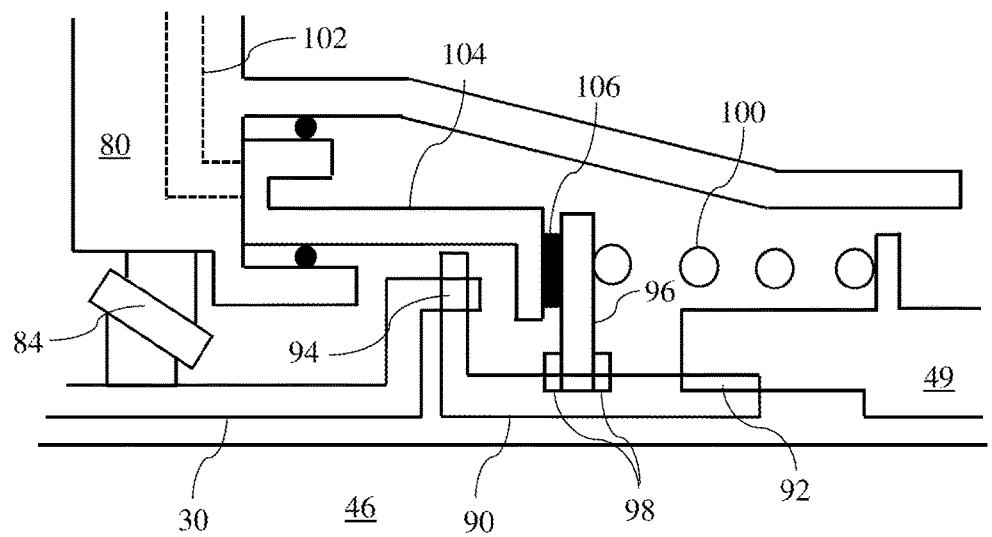
FIG. 3 is a cross sectional view of a hydraulically actuated normally engaged disconnect clutch in the engaged position.
Figure 4:
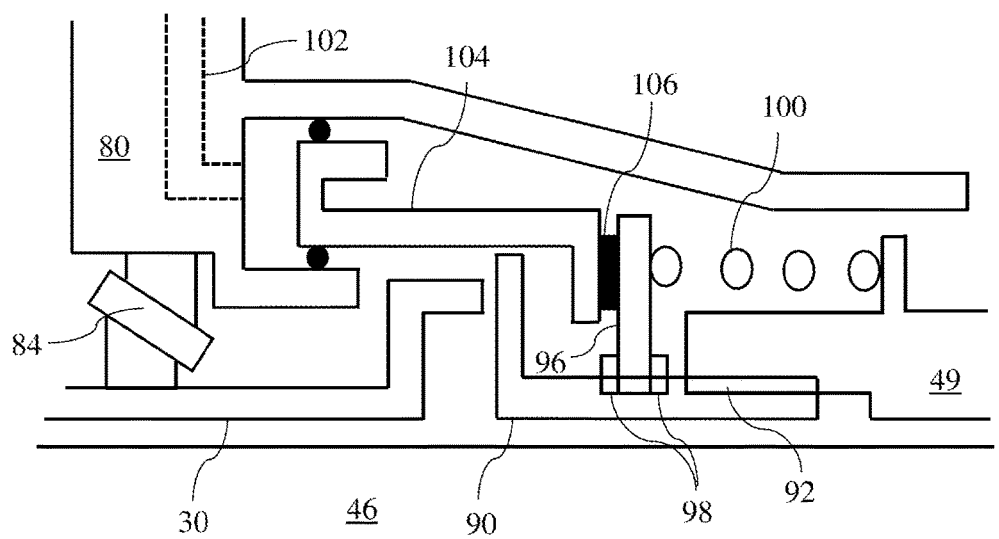
FIG. 4 is a cross sectional view of the hydraulically actuated disconnect clutch of FIG. 3 in the disengaged position.

FIG. 3 shows a first embodiment of disconnect clutch 52 in an engaged position. Dog 90 is splined to power take-off shaft 49 at 92 such that dog 90 rotates with power take-off shaft 49 but may slide axially with respect to power take-off shaft 49. In the axial position shown in FIG. 3, teeth of dog 90 engage with teeth of shaft 30 such that the two shafts are forced to rotate together. Member 96 is fixed to dog 90 by snap rings 98. Spring 100 pushes dog 90 to the left towards the position shown. Thus, this embodiment of the disconnect clutch is biased toward the engaged state. To release the disconnect clutch, pressurized fluid is routed through channel 102 to push piston 104 toward the right. Piston 104 pushes member 96 to the right through thrust bearing 106. FIG. 4 shows this embodiment in the disengaged position. In this position, dog 90 is axially separated from shaft 30 such that the two shafts are free to rotate at different speeds. Since disconnect clutch 52 is integrated into the transmission, the same valve body that controls the flow of pressurized fluid to various clutches in gearbox 18 to select speed ratios can control the flow of hydraulic fluid to disconnect clutch 52.

Figure 5:
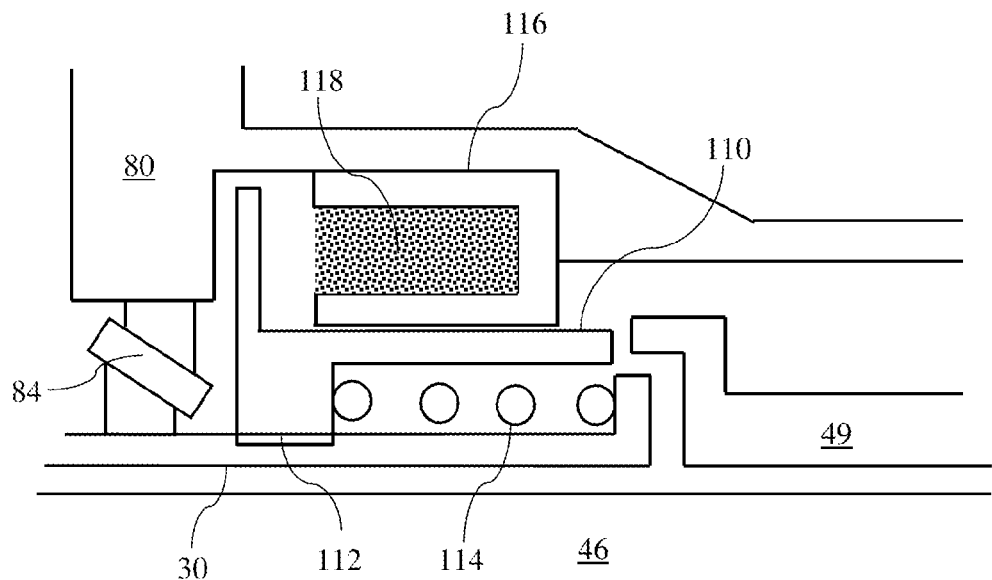
FIG. 5 is a cross sectional view of an electro-magnetically actuated normally disengaged disconnect clutch in the disengaged position.
Figure 6:
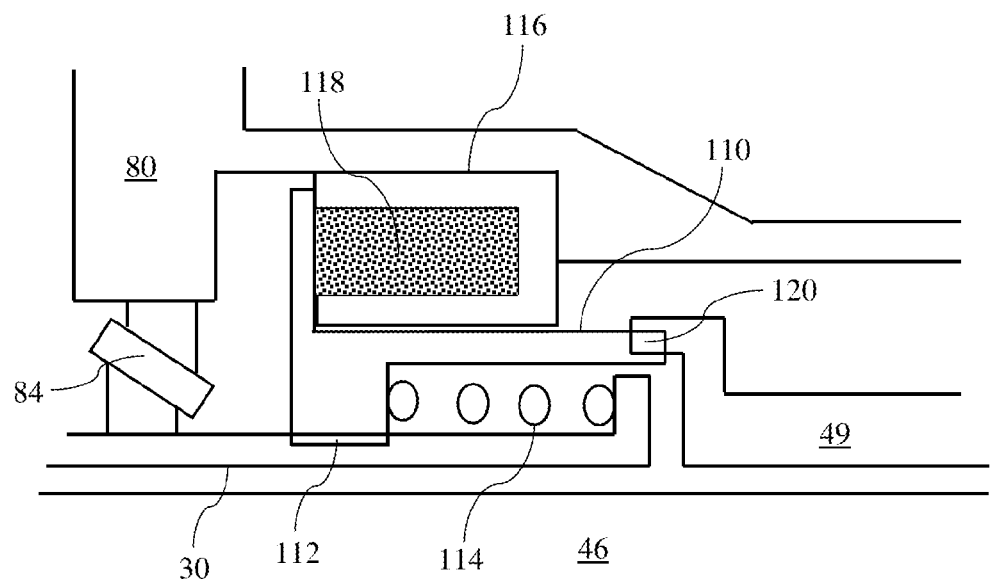
FIG. 6 is a cross sectional view of the electro-magnetically actuated disconnect clutch of FIG. 5 in the engaged position.

FIG. 5 shows a second embodiment of disconnect clutch 52 in a disengaged position. Dog 110, made of a magnetically conductive material, is splined to shaft 30 at 112 such that dog 90 rotates with shaft 30 but may slide axially with respect to shaft 30. Spring 114 pushes dog 110 to the left towards the position shown. In this position, dog 100 is axially separated from power take-off shaft 49 such that the two shafts are free to rotate at different speeds. Thus, this embodiment of the disconnect clutch is biased toward the disengaged state. Coil module 116 is fixed to transmission case 80. To engage the disconnect clutch, electrical current is supplied to coils 118 creating a magnetic field to push dog 110 toward the right. FIG. 6 shows this embodiment in the engaged state. In the axial position shown in FIG. 6, teeth of dog 110 engage with teeth of power take-off shaft 49 at 120 such that the power take-off shaft 49 and shaft 30 are forced to rotate together.

The clutches illustrated in FIGS. 3-6 are not designed to be engaged in the presence of relative speed between shaft 30 and shaft 49. In order to engage clutch 52 while the vehicle is moving, engaging TOD clutch 64 synchronizes the speed of shaft 30 and shaft 49 as long as the front and rear wheels are rotating at the same speed, as they would be if both have traction. After bringing the speeds close with the TOD clutch, the TOD clutch may be released while disconnect clutch 52 is engaged. If the speed difference is small, the disconnect clutch will be able to engage as long as vehicle inertia is not restraining the driveshaft from changing speed slightly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
   an engine;
   a multiple ratio gearbox having an input shaft driven by the engine and an output gear supported for rotation about the input shaft;
   a transfer shaft having a driven transfer gear meshing with the output gear and a driving transfer gear meshing with a final drive gear;
   a differential configured to transfer power from the final drive gear to first and second axle shafts; and
   a disconnect clutch configured to selectively transfer power from the final drive gear to a power take-off shaft; and
   a bearing supporting the final drive gear for rotation with respect to a transmission housing,
   wherein the bearing is located axially between the driven transfer gear and the disconnect clutch and wherein the driven transfer gear extends between the differential and the disconnect clutch.

2. The powertrain of claim 1 further comprising a torque converter having an impeller fixed to a crankshaft of the engine and a turbine fixed to the input shaft.

3. The powertrain of claim 1 further comprising a power take-off unit configured to transmit power from the power take-off shaft to a driveshaft supported for rotation about an axis substantially perpendicular to the first and second axle shafts.

4. The powertrain of claim 3 further comprising a rear drive unit configured to selectively transmit power from the driveshaft to third and fourth axle shafts supported for rotation about an axis substantially parallel to the first and second axle shafts.

5. The powertrain of claim 1 wherein the differential is a planetary differential.

6. The powertrain of claim 5 wherein the differential is a double pinion planetary differential comprising:
   a carrier fixed to one of the first and second axle shafts;
   a sun gear fixed to the other of the first and second axle shafts;
   an inner set of planet gears supported for rotation with respect to the carrier and meshing with the sun gear;
   an outer set of planet gears supported for rotation with respect to the carrier and meshing with the inner set of planet gears; and
   a ring gear meshing with the outer set of planet gears and fixed to the final drive gear.

7. The powertrain of claim 1 wherein the disconnect clutch comprises a dog configured to slide axially from a first position in which the final drive gear and the power take-off shaft are free to rotate at different speeds to a second position in which the final drive gear and the power take-off shaft are coupled to rotate as a unit.

8. The powertrain of claim 7 wherein the disconnect clutch further comprises a spring configured to force the dog towards the second position.

9. The powertrain of claim 8 wherein the disconnect clutch further comprises a piston configured to force the dog towards the first position in response to a hydraulic pressure.

10. The powertrain of claim 7 wherein the disconnect clutch further comprises a spring configured to force the dog towards the first position.

11. The powertrain of claim 10 wherein the disconnect clutch further comprises a coil configured to magnetically force the dog toward the second position in response to an electric current.

12. A transmission comprising:
   a planetary differential configured to transfer power from a final drive gear to first and second axle shafts;
   a clutch configured to selectively transfer power from the final drive gear to a power take-off shaft supported for rotation about the first axle shaft;
   a transfer shaft having a driving transfer gear meshing with the final drive gear and a driven transfer gear extending between the differential and the clutch; and
   a bearing supporting the final drive gear for rotation with respect to a transmission housing, the bearing located axially between the driven transfer gear and the disconnect clutch.

13. The transmission of claim 12 further comprising a multiple ratio gearbox having a gearbox input shaft and a gearbox output gear supported for rotation about the gearbox input shaft and meshing with the driven transfer gear.

14. The transmission of claim 13 further comprising a launch device configured to transmit power to the gearbox input shaft from a power source rotating faster than the gearbox input shaft.

15. The transmission of claim 14 wherein the launch device is a torque converter having an impeller adapted for connection to an engine crankshaft and a turbine fixed to the gearbox input shaft.

16. The transmission of claim 12 wherein the differential is a double pinion planetary differential comprising:
- a carrier fixed to one of the first and second axle shafts;
- a sun gear fixed to the other of the first and second axle shafts;
- an inner set of planet gears supported for rotation with respect to the carrier and meshing with the sun gear;
- an outer set of planet gears supported for rotation with respect to the carrier and meshing with the inner set of planet gears; and
- a ring gear meshing with the outer set of planet gears and fixed to the final drive gear.

17. The transmission of claim 12 wherein the clutch comprises a dog configured to slide axially from a first position in which the final drive gear and the power take-off shaft are free to rotate at different speeds to a second position in which the final drive gear and the power take-off shaft are coupled to rotate as a unit.

18. The transmission of claim 17 wherein the clutch further comprises a spring configured to force the dog towards the second position.

19. The transmission of claim 18 wherein the clutch further comprises a piston configured to force the dog towards the first position in response to a hydraulic pressure.

20. The transmission of claim 17 wherein the clutch further comprises a spring configured to force the dog towards the first position.

21. The transmission of claim 20 wherein the clutch further comprises a coil configured to magnetically force the dog toward the second position in response to an electric current.

* * * * *